United States Patent [19]

Harlos

[11] Patent Number: 4,698,557
[45] Date of Patent: Oct. 6, 1987

[54] CIRCUIT ARRANGEMENT FOR THE CONTROL OF A PICTURE TUBE

[75] Inventor: Hartmut Harlos, Norderstedt, Fed. Rep. of Germany

[73] Assignee: U. S. Philips Corporation, New York, N.Y.

[21] Appl. No.: 787,395

[22] Filed: Oct. 15, 1985

[30] Foreign Application Priority Data

Oct. 17, 1984 [DE] Fed. Rep. of Germany ....... 3437952

[51] Int. Cl.[4] ............................................ H01J 29/52
[52] U.S. Cl. .................................... 315/383; 358/168
[58] Field of Search .................. 315/383; 358/74, 168, 358/169, 219, 243

[56] References Cited

U.S. PATENT DOCUMENTS 4,509,074 4/1985 Krauss et al. ....................... 358/168

Primary Examiner—Theodore M. Blum
Attorney, Agent, or Firm—Thomas A. Briody; William J. Streeter; Gregory P. Gadson

[57] ABSTRACT

A circuit arrangement for the control of at least one beam current in a picture tube (9) contains a cut-off point control which on the occurrence of a given reference level in the picture signal adjusts the beam current in one sampling interval to a preset value. A trigger circuit (19) and a logic network (22) are provided to prevent picture interference during start-up of the picture tube (9) due to the beam currents which slowly rise as the hot cathodes (8; 801, 802, 803) heat up and due to the cut-off point control which responds only after the build-up of these beam currents. The trigger circuit (19) suppresses auxiliary pulses used to generate the beam current after the picture tube (9) is turned on and issues a switching signal to close the control loop during the sampling intervals and to release the control of the beam current by the picture signal when the beam current has built up, and the logic network (22) does not release the control of the beam currents by the picture signal until, after the switching signal, a change signal is issued from a change detector (25) indicating that the cut-off point control has responded.

5 Claims, 4 Drawing Figures

CIRCUIT ARRANGEMENT FOR THE CONTROL OF A PICTURE TUBE

BACKGROUND OF THE INVENTION

The invention relates to a circuit arrangement for the control of at least one beam current in a picture tube by a picture signal with a control loop which in one sampling interval obtains a measuring signal from the value of the beam current on the occurrence of a given reference level in the picture signal, stores a control signal derived therefrom until the next sampling interval and by this means adjusts the beam current to a value preset by a reference signal, and with a trigger circuit which suppresses auxiliary pulses used to generate the beam current after the picture tube is turned on and issues a switching signal for the purpose of closing the control loop during the sampling intervals and releasing the control of the beam current by the picture signal after the measuring signal has exceeded a threshold value.

Such a circuit arrangement has been described in Valvo Technische Information 820705 with regard to the integrated color decoder circuit TDA 3562 A and is used in this as a so-called cut-off point control. In the known circuit arrangement, such a cut-off point control provides automatic compensation of the so-called cut-off point of the picture tube, i.e. it regulates the beam current in the picture tube in such a way that for a given reference level in the picture signal the beam current has a constant value despite tolerances and changes with time (aging, thermal modifications) in the picture tube and the circuit arrangement, thereby ensuring correct picture reproduction.

Such a blocking point control is particularly advantageous for the operation of a picture tube for the display of color pictures because in this case there are several beam currents for different color components of the color picture which have to be in a fixed ratio with one another. If this ratio changes, for example, as the result of manufacturing tolerances or ageing processes, distortions of the colors occur in the reproduction of the color picture. The beam currents, therefore, have to be very accurately balanced. The said cut-off point control prevents expensive adjustment and maintenance time which is otherwise necessary.

Conventional picutre tubes are constructed as cathode-ray tubes with hot cathodes which require a certain time after being turned on for the hot cathodes to heat up. Not until a final operating temperature has been reached do these hot cathodes emit the desired beam currents to the full extent, while gradually rising beam currents occur in the time interval when the hot cathodes are heating up. The instantaneous values of these beam currents depend on the instantaneous temperatures of the hot cathodes and on the accelerating voltages for the picture tube which build up simultaneously with the heating process and are undefined until the end of the heating time. After the picture tube is turned on, these values initially produce a highly distorted picture until the beam currents have attained their final value. These picture distortions after the picture tube is turned on are even further intensified by the fact that the cut-off point control is not yet adjusted to the beam currents which flow after the heating time is over.

For the purpose of suppressing distorted pictures during the heating time of the hot cathodes, the known circuit arrangement has a turn-on delay element operating as a trigger circuit which, in essence, contains a bistable flip-flop. When the picture tube and the circuit arrangement controlling the beam currents flowing in it are turned on, the flip-flop is switched into a first state in which it interrupts the supply of the picture signal to the picture tube. Thus, during the heating time the beam currents are suppressed, and the picture tube does not yet display any picture. In sampling intervals which are provided subsequent to flybacks of the cathode beam into an initial position on the changeover from the display of one picture to the display of a subsequent picture and even within the changeover, that is outside the display of pictures, the picture tube is controlled for a short time in such a way that beam currents occur when the hot cathodes are sufficiently heated up and an accelerating voltage is resent. If these currents exceed a certain threshold value, the flip-flop circuit switches into a second state and releases the picture signal for the control of the beam currents and the cut-off point control.

It is found, however, that the picture displayed in the picture tube immediately after the switching over of the flip-flop is still not fault-free. Because, in fact, the beam currents are supported during the heating time of the hot cathodes, the cut-off point control cannot respond yet. This response of the cut-off point control takes place only after the beam currents are switched on, i.e. after the flip-flop is switched into the second state and therefore at a time in which the picture signal already controls the beam currents. In this way the response of the blocking point control makes its presence felt in the picture displayed.

With the known circuit arrangement the brightness of the picture gradually increases, during the response of the cut-off point control, from black to the final value.

This slow increase in the picture brightness after the tube is turned on is disturbing to the eyes of the viewer not only in the case of the black-and-white picture tubes with one hot cathode, but especially so in the case of colour picture tubes which usually have three hot cathodes. With a color picture tube, color purity errors can also occur in addition to the change in the picture brightness if, as a result of different speeds of response of the cut-off point control for the three beam currents, there are found to be intermittent variations from the interrelation between the beam currents required for a correct picture reproduction.

SUMMARY OF THE INVENTION

The aim of the invention is to create a circuit arrangement which suppresses the above-described disturbances of brightness and color of the displayed picture when the picture tube is being started.

The invention achieves this aim in that a circuit arrangement of the type mentioned in the preamble contains a change detection arrangement which emits a change signal when the stored signal has assumed an essentially constant value, and a logic network which does not release the control of the beam current by the picture signal until the change signal has also been emitted after the switching signal.

In the circuit arrangement according to the invention, therefore, the display of the picture is suppressed after the picture tube is turned on until the cut-off point control has responded. If the picture signal then starts to control the beam current, a perfect picture is displayed immediately. In this way, all the disturbances of the picture which affect the viewer's pleasure are suppressed. The circuit arrangement of the invention is of simple design and can be combined on one semiconductor wafer with the existing picture signal processing circuits and also, for example, with the known circuit arrangement for cut-off point control. Such an integrated circuit arrangement not only requires very little space on the semiconductor wafer, but also needs no additional external leads. Thus the circuit arrangement of the invention can be arranged, for example, in an integrated circuit which has precisely the same external connections as known integrated circuits. This means that an integrated circuit containing the circuit arrangement of the invention can be directly incorporated in existing equipment without the need for additional measures.

In one embodiment of the said circuit arrangement, in which the picture signal contains several color signals for the control of a corresponding number of beam currents for representing a color picture in the picture tube and, for each color signal, the control loop stores a part measuring signal or a part control signal derived from it, the change detection arrangement contains a change detector for each color signal which emits a part change signal when the relevant stored signal has assumed an essentially constant value, and the logic network does not release the control of the beam currents by the color signals outside the sampling intervals until the part change signals have been emitted from all change detectors.

In principle, therefore, such a circuit arrangement has three cut-off point controls for the three beam currents controlled by the individual color signals. To reduce the cost of the circuitry, the measuring stage is common to all the cut-off point controls, as in the known circuit arrangement. All three beam currents are then measured successively by this measuring stage. In this way, a part measuring signal or a part control signal derived from it is obtained for each beam current and is stored sesparately according to which of the beam currents it belongs. Changes in the part measuring signal or part control signal are detected for each beam current by one of the change detectors each time. Each of these change detectors issues a part change signal to the logic network. The latter does not release the control of the beam currents by the picture signal outside the sampling intervals until all the part change signals indicate that the part measuring signal or the part control signal, as the case may be, remains constant. This ensures that the cut-off point controls for the beam currents of all color signals have responded when the picture appears in the picture tube.

In a further embodiment of the circuit arrangement according to the invention with a comparator arrangement which compares the measuring signal with the reference signal and derives the control signal from this comparison, the change detection arrangement detects a change in the control signal with respect to time and issues the change signal when the control signal has assumed an essentially constant value. In the case of the representation of a color signal the comparator arrangement derives several part control signals, whose changes with time are detected by the change detectors, from a corresponding comparison of the part measuring signals with the reference signal. In this embodiment of the circuit arrangement of the invention, preference is given to storage of only the control signal or the part control signals for the purpose of controlling the beam currents.

In another embodiment of the circuit arrangement of the invention which includes a control signal memory which contains at least one capacitor in which a charge or voltage corresponding to the control signal is stored, the change detection arrangement issues the change signal when a charge-reversing current of the capacitor occurring during the turning on of the picture tube has fallen below a limit value and has thus at least largely decayed. Such a detection of the steady state of the cut-off point control is independent of the actual magnitude of the control signal and therefore independent of, for example, the level of the picture tube cut-off voltage, circuit tolerances or ageing processes in the circuit arrangement or the picture tube.

Detection of whether or not the charge-reversing current exceeds the limit value is performed preferentially by a current detector which is designed with a current mirror system which is arranged in a supply line to a capacitor acting as a control signal store. A current mirror arrangement of this kind supplies a current which coincides very precisely with the charging current of the capacitor. This current is then compared, preferably in a further device contained in the change detection arrangement, with a current representing a limit value or, after conversion into a voltage, with a voltage representing the limit value. The change signal is obtained from the result of this comparison.

On the other hand, digital memories may also be used as control signal memories, especially when the picture signal is supplied as a digital signal and the blocking point control is constructed as a digital control loop. In such a case, the comparator arrangement, the change detection arrangement and the trigger circuit are also designed as digital circuits. Then, the change detection arrangement advantageously forms the difference of the signals stored in the control signal memory in two successive sampling intervals and compares this with the limit value formed by a digital value. If the difference falls short of the limit value, the change signal is issued.

BRIEF DESCRIPTION OF THE DRAWINGS

An embodiment of the invention is described in greater detail below with the aid of the drawings in which.

DETAILED DESCRIPTION OF THE INVENTION

Figure 1:
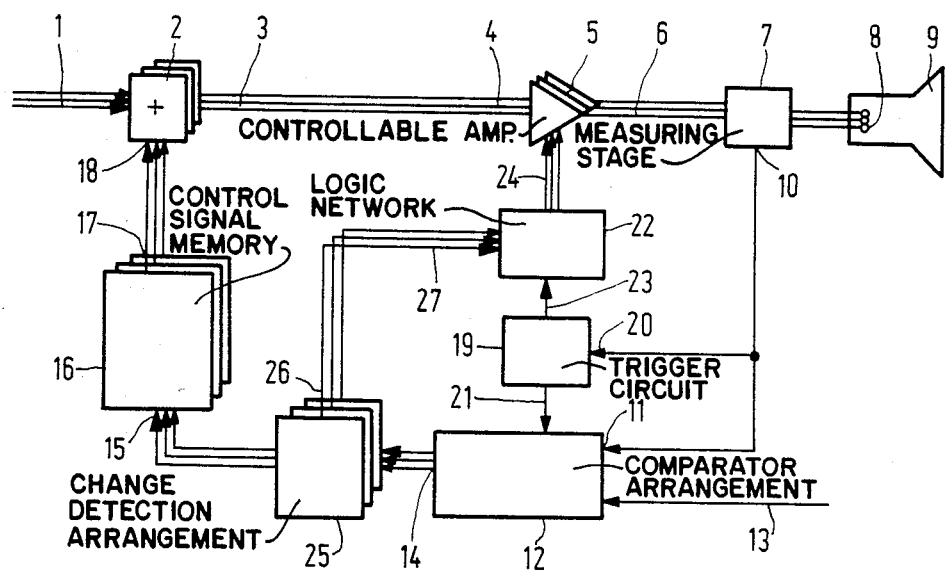
FIG. 1 shows a block circuit diagram of the embodiment.

FIG. 1 shows a block circuit diagram of a circuit arrangement to which a picture signal is fed via a first input 1 of a combinatorial stage 2. From the output 3 of the combinatorial stage 2 the picture signal is fed to the picture signal input of a controllable amplifier 5 which at an output 6 issues a current controlled by the picture signal. This current is fed via a measuring stage 7 to a hot cathode 8 in a picture tube 9 and forms therein a beam current of a cathode ray by means of which a picture defined by the picture signal is displayed on a fluorescent screen of the picture tube 9.

The measuring stage 7 measures the current fed to the hot cathode 8, i.e. the the beam current in the picture tube 9, and at a measuring signal output 10, issues a measuring signal corresponding to the magnitude of this current. This is fed to a measuring signal input 11 of a comparator arrangement 12 to which a reference signal is supplied at a reference signal input 13. In a preferably periodically recurring sampling interval during the occurrence of a given reference level in the picture signal, the comparator arrangement 12 forms a control signal from the value of the measuring signal fed to the measuring signal input 11 at this time, on the one hand, and the reference signal, on the other, by means of substraction and delivers this at a control signal output 14. From there the control signal is fed to an input 15 of a control signal memory 16 and is stored in the latter. The control signal is fed via an output 17 of the control signal memory 16 to a second input 18 of combinatorial stage 2 in which it is combined with the picture signal, e.g. added to it.

The combinatorial stage 2, the controllable amplifier 5, the measuring stage 7, the comparator arrangement 12 and the control signal memory 16 form a control loop with which the beam current is guided towards the reference signal in the sampling interval during the occurrence of the reference level in the picture signal. For the reference level, use is made in particular of a black level or a level with small, fixed distance from the black level, i.e. a value in the picture signal which produces a black or almost back picture area in the displayed picture in the picture tube. In this case the control loop, as described, forms a cut-off point control for the picture tube. If the reference level is away from the black level, the control loop is also designated as quasi-cut-off-point control.

The circuit arrangement as shown in FIG. 1 also has a trigger circuit 19 to which the measuring signal from the measuring signal output 10 of measuring stage 7 is fed at a measuring signal input 20. When the circuit arrangement and therefore the picture tube are turned on, the trigger circuit 19 is set in a first state in which by means of a first connection 21 it blocks the comparator arrangement 12 in such a way that the latter delivers no control signal or a control signal with the value zero at its control signal output 14. This prevents the control signal memory 16 from storing undefined values for the control signal at the moment of turning on or immediately thereafter.

The circuit arrangement shown in FIG. 1 also has a logic network 22 which is connected via a second connection 23, by means of which a switching signal is supplied, with the trigger circuit 10 and via a third connection 24 with the controllable amplifier 5. Like the trigger circuit 19, the logic network 22 also finds itself controlled, when the circuit arrangement is being turned on, by the switching signal in a first stage in which by way of the third connection 24 it blocks the controllable amplifier 5 with a blocking signal in such a way that no beam currents controlled by the picture signal can yet flow in the picture tube 9. Thus the picture tube 9 is blanked; no picture is displayed yet.

When picture tube 9 is turned on, the hot cathode 8 is still cold so that no beam current can flow anyhow. The hot cathode 8 is then heated up and, after a certain time, begins gradually to emit electrons as the result of which a cathode ray and therefore a beam current can form. However, during the heating up of the hot cathode 8, and because the cut-off point control has not yet responded, this would be undefined and is therefore suppressed by the controllable amplifier 5. Only in time intervals which are provided immediately subsequent to flybacks of the cathode rays into an initial position at the changeover from the display of one image to that of a subsequent image, but even before the start of the display of the subsequent image, the controllable amplifier 5 delivers a voltage in the form of an auxiliary pulse for a short time at its output 6, and when the hot cathode 8 in the picture tube 9 is heated up sufficiently, this voltage produces a beam current. The time interval for the delivery of this voltage is selected in such a way that a cathode ray produced by its does not produce a visible image in the picture tube 9, and coincides for example with the sampling interval.

The measuring stage 7 measures the short-time cathode current produced in the manner described and, at its measuring signal output 10, delivers a corresponding measuring signal which is passed via measuring signal output 20 to the trigger circuit 19. If the measuring signal exceeds a definite preset threshold value, the trigger circuit 19 is switched into a second state in which it releases the comparator arrangement 12 via the first connection 12 and, by means of the second connection 23, uses the switching signal to also bring the logic network 22 into a second state. The comparator arrangement 12 now evaluates the measuring signal supplied to it via the measuring signal input 11, i.e. it forms the control signal as the difference between the measuring signal and the reference signal supplied via the reference signal input 13. The control signal is transferred via the control signal output 14 and the input 15 into the control signal memory 16. It is subsequently fed via the output 17 of the control signal memory 16 to the second input 18 of the combinatorial stage 2 and is there combined with the picture signal at the first input 1, e.g. is superimposed on it by addition. This superimposed picture signal is fed to the picture signal input 4 of the controllable amplifier 5 via the output 3 of the combinatorial stage 2.

In the second state of the logic network 22 the controllable amplifier 5 is switched via the third connection 24 by the blocking signal in such a way that the picture signal controls the beam currents only during the sampling intervals and that, for the rest, no image appears yet in the picture tube. The cut-off point control now gebins to respond, i.e. the value of the control signal is changed by the control loop comprising the combinatorial stage 2, the controllable amplifier 5, the measuring stage 7, the comparator arrangement 12 and the control signal memory 16 until such time as the beam current in the picture tube 9 at the blocking point or at a fixed level with respect to it is adjusted to a value preset by the reference signal. For this purpose the sampling interval, in which the picture signal controls the beam current via the controllable amplifier 5 is selected in such a way that within it the picture signal just assumes a value corresponding to the cut-off point or to a fixed level with respect to it.

During the response of the cut-off point control the control signal fed to the control signal memory 16 changes continuously. Between the control signal output 14 of the comparator arrangement 12 and the input 15 of the control signal memory 16 is inserted a changed detection arrangement 25 which detects the variations of the control signal. When the cut-off point control has responded, i.e. the control signal has assumed a constant value, the change detection arrangement 25 delivers a change signal at an output 26 which indicates that the steady stage of the cut-off point control is achieved and the said signal is fed to a change signal input 27 of the logic network 22. The logic network then switches into a third state in which via the third connection 24 it enables the controllable amplifier 5 in such a way that the beam currents are now controlled without restriction by the picture signal. Thus a correctly represented picture appears in the picture tube 9.

A shadow-like representation of individual constituents of the circuit arrangement in FIG. 1 is used to indicate a modification by which this circuit arrangement is equipped for the representation of color pictures in the picture tube 9. For example, three color signals are fed in this case as the picture signal via the input 1 to the combinatorial stage 2. Accordingly, the input 1 is shown in triplicate, and the combinatorial stage 2 has a logic element, e.g. an adder, for example of these color signals. The controllable amplifier 5 now has three amplifier stages, one for each of the color signals, and the picture tube now contains three hot cathodes 8 instead of one so that three independent cathode rays are available for the three color signals.

However, to simplify the circuit arrangement and to save on components, only one measuring stage 7 is provided which measures all three beam currents successively. Also, the comparator arrangement 12 forms part control signals from the successively arriving part measuring signals for the individual beam currents with the reference signal, and these part control signals are allocated to the individual color signals and passed on to three storage units which are contained in the control signal memory 16. From there, the part control signals are sent via the second input 18 of the combinatorial stage 2 to the assigned logic elements.

The circuit arrangement thus forms three independently acting control loops for the cut-off point control of the individual color signals, in which case only the measuring stage 7 and to some extent at least the comparator arrangement 12 are common to these control loops.

The change detection arrangement 25 now has three change detectors each of which detects the changes with time of the part control signals relating to a color signal. Then via the output 26 each of these change detectors delivers a part change signal to the change signal input 27 of the logic network 22. These part change signals occur independently of one another when the relevent control loop has responded. The logic network 22 evaluates all three part change signals and does not switch into its third stage until all part change signals indicate a steady state of the control loops. Only then, in fact, is it ensured that all the color signals from the beam currents controlled by them are correctly reproduced in the picture tube, and thus no distortions of the displayed image, especially no color purity errors, occur. The color picture displayed then immediately has the correct brightness and color on its appearance when the picture tube is turned on.

Figure 2:
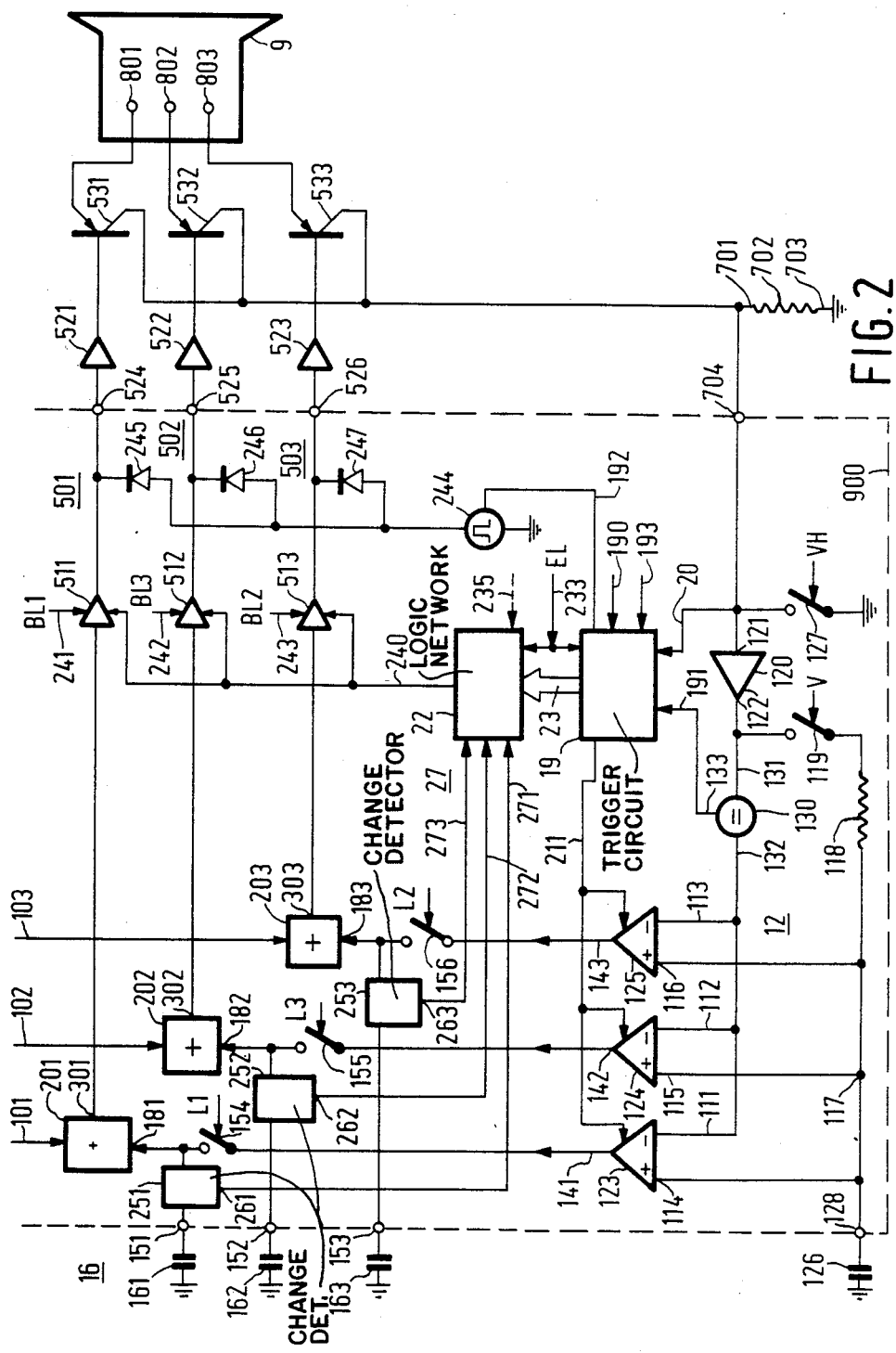
FIG. 2 shows a somewhat more detailed block circuit diagram of the embodiment.

FIG. 2 shows a somewhat more detailed block circuit diagram of an embodiment of a circuit arrangement equipped for the processing of a picture signal containing three colour signals. Three color signals for the representation of the colors red, green and blue are fed to this circuit arrangement via three input terminals 101, 102, 103. A red color signal is fed via the first input terminal 101 to a first adder 201, a green colour signal is fed via the second input terminal to a second adder 202, and a blue colour signal is fed via the third input terminal 103 to a third adder 203. From outputs 301, 302 and 303 of the adders 201, 202, 203 the color signals are fed to amplifier stages 501, 502 and 503 respectively. Each of the amplifier stages contains a switchable amplifier 511, 512 and 513, an output amplifier 521, 522 and 523 as well as a measuring transistor 531, 532 and 533 respectively. The emitters of these measuring transistors 531, 532, 533 are each connected to a hot cathode 801, 802, 803 of the picture tube 9 and deliver the cathode currents, whereas the collectors of measuring transistors 521, 532, 533 are connected to one another and to a first terminal 701 of a measuring resistor 702 the second terminal of which 703 is connected to earth. The current gain of the measuring transistors 531, 532 and 533 is so great that their collector currents coincide almost with the cathode currents. By measuring the voltage drop produced by the cathode currents at the measuring resistor 802 it is then possible to measure the cathode currents and therefore the beam currents in the picture tube 9 with great accuracy.

The falling voltage at the measuring resistor 702 is fed as a measuring signal to an input 121 of a buffer amplifier 120 with a gain factor of one, at the output 122 of which the unchanged measuring signal is therefore available at low impedance. From there it is fed to a first terminal 131 of a reference voltage source 130 which is connected with its second terminal 132 to inverting inputs 111, 112 and 113 of three differential amplifiers 123, 124, 125 respectively. The differential amplifiers 123, 124, 125 also each have a non-inverting input 114, 115, and 116 respectively. These are connected to each other at a junction 117, to earth via a leakage current storage capacitor 126 and to the output 122 of the buffer amplifier 120 via decoupling resistor 118 and a leakage current sampling switch 119. In addition, the input 121 of the buffer amplifier 120 can be connected to earth via a short-circuiting switch 127.

From outputs 141, 142, and 143 respectively of the differential amplifiers 123, 124 and 125, part control signals relating to the individual color signals are fed in the form of electrical voltages (or, in some cases, charge-reversing currents) via control signal sampling switches 154, 155 and 156, in the one instance, to first terminals 151, 152 and 153 respectively of control signal storage capacitors 161, 162, 163 which form the storage units of the control signal memory 16 and store inside them charges corresponding to these voltages (or formed by the charge-reversing currents). In the other instance, the part control signals are fed to second inputs 181, 182 and 183 of the first, second or third adders 201, 202, 203 respectively and are added therein to the color signals from the first, second or third input terminals 101, 102 or 103 respectively.

Figure 3:
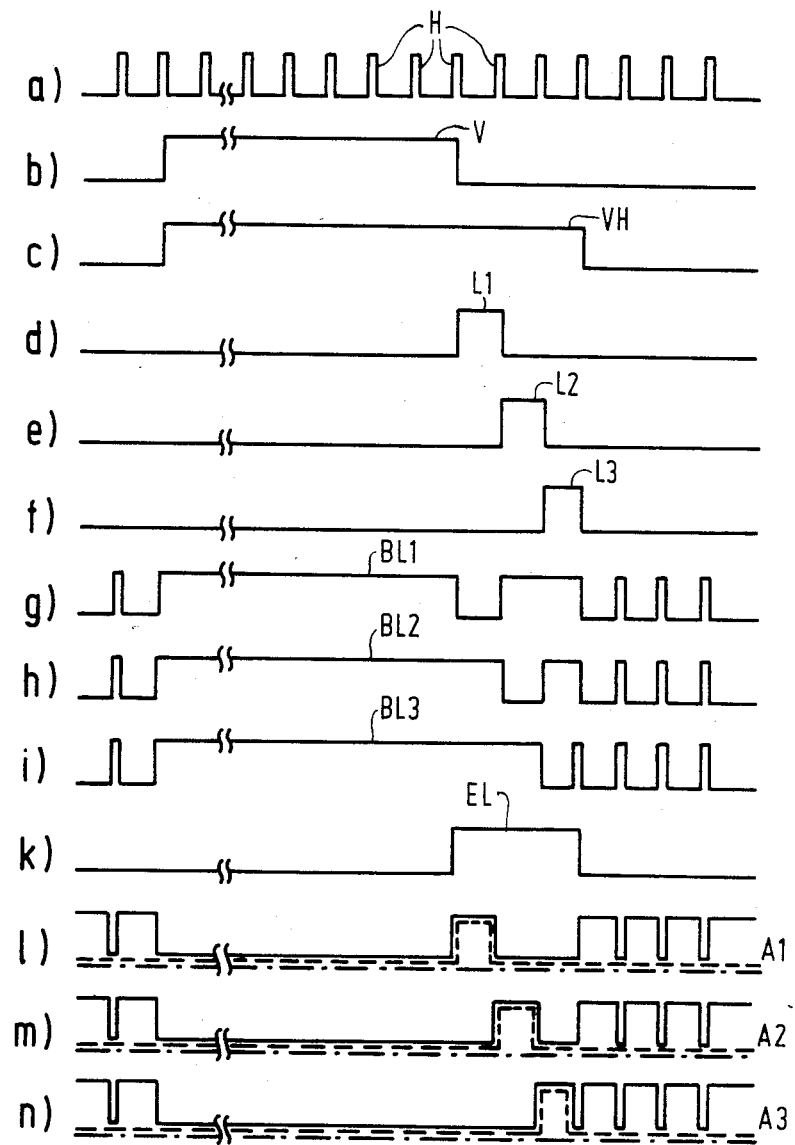
FIG. 3 shows time-dependency diagrams of some signals occurring in the circuit diagram shown in FIG. 2.

The operation of the comparator arrangement 12 which consists mainly of the buffer amplifier 120, the reference voltage source 130 and differential amplifiers 123, 124, 125 will be explained below with the aid of the pulse diagrams in FIG. 3. FIG. 3a shows a horizontal blanking signal for a television signal which, as the picture signal, controls the beam currents in the picture tube 9. In this diagram, H represents horizontal blanking pulses which follow one another in the picture signal at the time interval of one line duration and by means of which the beam currents are switched off during line flyback between the display of the individual picture lines in the picture tube. FIG. 3b shows a vertical blanking pulse V by means of which the beam currents are switched off during the change ober from the display of one picture to the display of the next picture. FIG. 3c shows a measuring signal control pulse VH which is formed from a vertical blanking pulse lengthened by three line duration.

The short-circuiting switch 127 is now controlled in such a way that it is non-conducting only throughout the duration of the measuring signal control pulse VH and during the remaining time short-circuits the input 121 of the buffer amplifier 120 to earth. This means that a measuring signal only reaches the comparator arrangement 12 during frame change so that the parts of the picture signal which control the beam currents producing the picture in the picture tube exert no influence on comparator arrangement 12 and therefore on the blocking point control.

Throughout the duration of the measuring signal control pulse VH, the measuring signal from output 122, reduced by a reference voltage issued by the reference voltage source 130 between its first 131 and its second terminal 132, is present at the inverting inputs 111, 112, 113 of differential amplifiers 123, 124, 125. If the differential amplifiers 123, 124, 125 were not present, this difference would be fed directly as part control signals to the control signal storage capacitors 161, 162, 162. The differential amplifiers 123, 124, 125 amplify the difference and thus form the control amplifiers of the control loops.

The comparator arrangement 12 further contains a device for compensation of the influence of any leakage currents occurring in the picture tube 9. For this purpose, a voltage to which the leakage current storage capacitor 126 is charged is fed to the non-inverting inputs 114, 115, 116 of the three differential amplifiers 123, 124 and 125. The charging is performed by the measuring signal from output 122 of the buffer amplifier 120 via the decoupling resistor 118 and the leakage current sampling switch 119 which is closed only within the period of the vertical blanking pulse V, and in certain cases only during part of the latter. Within this time the beam currents are, in fact, totally switched off by the picture signal so that in certain cases only a leakage current flows through the measuring resistor 702. Consequently, throughout the duration of the vertical blanking pulse V the measuring signal corresponds to this leakage current. Because the leakage current also flows during the remaining time, even outside the duration of the vertical blanking pulse the measuring signal contains a component originating from the leakage current which therefore is also contained in the voltage fed to the inverting inputs 111, 112, 113 of differential amplifiers 123, 124, 125 and is subtracted out in the differential amplifiers 123, 124, 125.

The part control signal is fed from output 141 of differential amplifier 123 by the first control signal sampling switch 154 to the first terminal 151 of the first control signal storage capacitor 161 during the period of a storage pulse L1 and is stored in the said capacitor. Similarly, the part control signal from output 143 of differential amplifier 125 is fed to the third control signal storage capacitor 163 during the period of a storage pulse L2 and the part control signal from output 142 of differential amplifier 124 is fed to the second control signal storage capacitor 162 during a storage pulse L3. The storage pulses L1, L2 and L3 are illustrated in FIGS. 3d, e and f. They lie in sequence in one of the three line periods by which the measuring signal control pulse VH is longer than the vertical blanking pulse V. These three line periods form the sampling interval for the measuring signal or the part measuring signals, as the case may be. During the remaining periods the outputs, 141, 152, 143 of the differential amplifiers 123, 124, 125 are isolated from the control signal storage capacitors 161, 162, 163 so that no interference can be transmitted from there and any distortion of the stored part control signals caused thereby is eliminated. For the duration of storage pulses L1, L2 and L3 the color signals at the input terminals 101, 102, 103 are at their reference level i.e. in the present embodiment at a level, corresponding to the blocking point or at a fixed level with respect to it so that the control loops can adjust to this level.

The switchable amplifiers 511, 512, and 513 each receive at each input 241, 242, 243 a blanking signal BL1, BL2, BL3 respectively, the curves of which are shown in FIGS. 3g, h, i. These blanking signals interrupt the supply of the color signals during line flybacks and frame change, i.e. during the period of the measuring signal control pulse VH, and thus the beam currents in these time intervals are switched off. Naturally, the red color signal is let through during the first line period after the end of the vertical blanking pulse V, the blue color signal during the second line period after the end of the vertical blanking pulse V and the green color signal during the third line period after the end of the vertical blanking pulse V by the switchable amplifiers 511, 512, 513 respectively so that they can control the beam currents. Blanking signals BL1, BL2 and BL3 also provide for interruptions in the frame change blanking pulse, which corresponds to the measuring signal control pulse, in the corresponding time intervals. In these time intervals the beam currents are measured and part control signals are determined from the part measuring signals and stored in the control signal storage capacitors 161, 162, 163.

The circuit arrangement shown in FIG. 2 further contains a trigger circuit 19 to which a supply voltage is fed via a supply terminal 190. Via a reset input 191 a voltage is also supplied to the trigger circuit 19 from a third terminal 133 of the reference voltage source 130. When the circuit arrangement is turned on, this voltage is designed so as to be delayed with respect to the supply voltage so that when the circuit arrangement is brought into operation the interplay of the two voltages produces a switch-on reset signal such that a low-value voltage pulse occurs at the reset input 191 during turn on, which means that the trigger circuit 19 is set in its first state. The reset input 191 can also be connected to another circuit of any configuration which generates a switch-on reset signal when the picture tube is turned on.

The trigger circuit 19 is further connected via a second connection 23 to a logic network 22 which, when the circuit arrangement is turned on, is also set into a first state via the second connection 23. In this first state the logic network 22 delivers a blocking signal at a blocking output 240 which is fed to the three switchable amplifiers 511, 512, 513. By this means the supply of the color signals to the output amplifiers 521, 522, 523 is interrupted completely so that no beam currents can be generated by these. No picture is therefore displayed.

An insertion signal EL which extends over the three line periods by which the measuring signal control pulse VH is longer than the vertical blanking pulse V, i.e. over the sampling interval, is also fed via a line 233 to the trigger circuit 19 and the logic network 22. As long as the trigger circuit 19 is in its first state, this insertion pulse EL is issued via a control output 192 from the trigger circuit 19 and fed to the pulse generator 244. During the period of the insertion pulse EL this generator produces a voltage pulse of a definite magnitude and passes this to output amplfiiers 521, 522, 523 as an auxiliary pulse via switching diodes 245, 246, 247. By this means the beam currents are switched on for a short time so as to receive a measuring signal despite the disconnected color signals as soon as at least one of the hot cathodes 801, 802, 803 delivers a beam current.

In its first state the trigger circuit 19 also delivers a signal via a control line 211, and this signal is used to switch the outputs 141, 142, 143 of the differential amplifiers 123, 124, 125 to earth potential or practically to earth potential. This suppresses effects of voltages at the inputs 111 to 116 of the differential amplifiers 123, 124, 125, especially effects of the reference voltage source 130 which may in some cases initiate incorrect charging of the control signal storage capacitors 161, 162, 163.

The measuring signal produced by means of the pulse generator 244 at the input 121 of the buffer amplifier 120 is also fed to the trigger circuit 19 via a measuring signal input 20. If it exceeds a preset threshold value, the trigger circuit 19 switched into its second state. The logic network 22 is then also switched into its second state via the second connection 23. The differential amplifiers 123, 124, 125, too, are triggered by the signal along the control line 211 into issuing a control signal defined by the difference in the voltages at its inputs 111 to 116. The pulse generator 244 is blocked by the control output 192. The blocking signal issued from the blocking output 240 of the logic network 22 now turns on the switchable amplifiers 511, 512, 513 in the time intervals defined by the storage pulses L1, L2, L3 in such a way that in these time intervals the color signals can produce beam currents to form a measuring signal by which the control loops respond. However, the display of the picture is still suppressed. The control signal storage capacitors 161, 162, 163 are charged up in this process. In the leads to the first terminals 151, 152, 153 there are change detectors 251, 252, 253 which detect the changes of the charging currents of the control signal storage capacitors 161, 162, 163 and at their outputs 261, 262, 263 in each case deliver a part change signal when the charging current of the control signal storage capacitor in question has decayed and thus the relevant control loop has responded. The part change signals are fed to three terminals 271, 272, 273 of the change signal input 27 of the logic network 22.

When part change signals are present from all change detectors 251, 252, 253, when therefore all control loops have responded, the logic network 22 switches from its second to its third state. The blocking signal from the blocking output 240 is now completely disconnected such that the switchable amplifiers 511, 512, 513 are now switched only by the blanking signals BL1, BL2, BL3. The colour signals are then switched through to the output amplifiers 521, 522, 523 and the picture is displayed in the picture tube.

Figure 4:
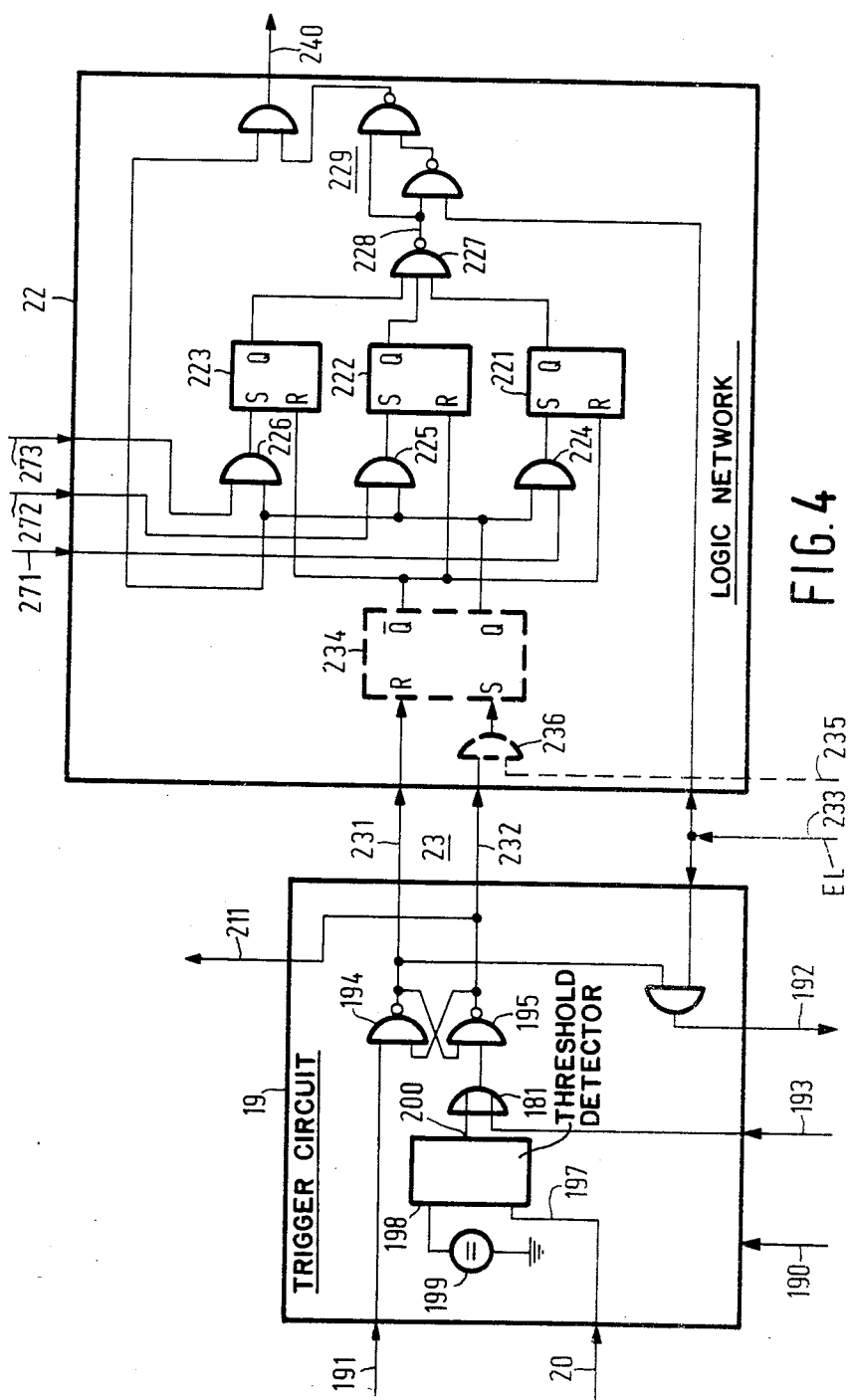
FIG. 4 shows a somewhat moredetailed block circuit diagram of a part of the circuit diagram shown in FIG. 2.

FIG. 4 shows an embodiment for a trigger circuit 19 and a logic network 22 of the circuit arrangements as shown in FIGS. 1 or 2. The trigger circuit 19 contains a flip-flop circuit formed from two NAND-gates 194, 195 to which the switch-on reset signal, by which the trigger circuit 19 is returned to its first stage, is fed via the reset input 191. All the elements of the circuit arrangement in FIG. 4 are shown in positive logic. Thus, a short-time low voltage at the reset input 191 immediately after the circuit arrangement is started up is used to set the flip-flop circuit 194, 195 in such a way that a high voltage occurs at the output of the second NAND gate 194 and a low voltage at the output of the second NAND gate 195. The low voltage at the output of the second NAND gate 195 blocks differential amplifiers 123, 124, 125 via the control line 211 in the manner described.

The insertion pulse EL is fed via the line 233 to the trigger circuit 19, is combined via an AND gate 196 with the signal from the output of the first NAND gate 194 and is delivered at the control output 192 for the purpose of controlling the pulse generator 244.

The signals from the outputs of the NAND-gates 194, 195 are fed via a first line 231 and a second line 232 of the second connection 23 as a switching signal to the logic network 22. The first line 231 is connected to reset inputs R of three part change signal memories 221, 222, 223 in the form of bistable flip-flop circuits which when the circuit arrangement is started up are reset via the first line 231 in such a way that they carry a low voltage at their outputs Q. The second line 232 of the second connection 23 leads via three AND gates 224, 225, 226 to setting inputs S of the three part change signal memories 221, 222, 223. By means of the AND gates 224, 225, 226 the signal on the second line 232 of the second connection 23 is combined each time with one of the part change signals supplied via the terminals 271, 272, 273. The signals from the outputs Q of the part change signal memories 221, 222, 223 are combined by means of a collecting gate 227 in the form of an NAND gate and are held ready at its output 228.

The measuring signal is fed to the trigger circuit 19 via the measuring signal input 20 and passed to a first input 197 of a threshold detector 198 to which at a second input a threshold value, in the form of a threshold voltage for example, produced by a threshold generator 199 is also supplied. When the voltage at the first input 197 of the threshold detector 198 is smaller than the voltage delivered by the threshold generator 199, the threshold detector 198 delivers a high voltage at its output 200. When, on the other hand, the voltage at the first input 197 is greater than the voltage of the threshold generator 199, the voltage at the output 200 jumps to a low value. This voltage is supplied as the setting signal of the flip-flop circuit 194, 195, reverses the latter and thereby switches the trigger circuit 19 into its second state when the voltage at the first input 197 exceeds the voltage of the threshold generator 199.

Between the output 200 and the flip-flop circuit 194, 195 in the circuit arrangement shown in FIG. 4 there is inserted an inquiry gate 181 in the form of an OR gate to which an inquiry pulse is fed via an inquiry input 193 of the trigger circuit 19. This ensures that the flip-flop circuit 194, 195 is switched over only at a time fixed by the inquiry pulse—in the present case a negative voltage pulse—and not at any other times due to disturbances. As such an inquiry pulse it is possible to use, for example, a pulse which occurs in the second line period after the end of the vertical blanking pulse V, i.e. one which largely corresponds to the storage pulse L2.

After the switching over of the flip-flop circuit 194, 195 corresponding to the setting of the trigger circuit 19 into the second state, appropriately modified signals are supplied via the control line 211 and the output 192 for the purpose of controlling the pulse generator 244 and the differential amplifiers 123, 124, 125. Modified voltages also appear on the lines 231, 232 of the second connection 23, and these voltages release the part change signal memories 221, 222, 223 such that they can each be set when the part change signals reach the terminals 271, 272, 273.

In certain cases, a further flip-flop circuit 234 is inserted in the lines 231, 232 to delay the signals passing along these lines; this is reset via the first line 231 when the circuit arrangement is started up and thus it also resets the part change signal memories 221, 222, 223. However, after the trigger circuit 19 is switched into the second state the further flip-flop circuit 234 is not set via the second line 232 of the second connection 23 until a release pulse arrives via a release input 235 and another AND gate 236, for example a period of approximately the interval of two vertical blanking pulses V after the switching of the trigger circuit 19 into the second state. In this way it is possible to bridge a period of time in which no defined signal values are present at the terminals 271, 272, 273.

The signal at the output 228 of the collecting gate 227 changes its state when the last of the three part change signals has also arrived and has set the last of the three part change signal memories. The signal is then combined via a gate arrangement 229 of two NAND gates and one AND gate with the insertion pulse EL of line 223 and with the signal on the second line 232 of the second connection 23 or from the output Q of the further flip-flop circuit 234 to the blocking signal delivered at the blocking output 24 which is fed to the switchable amplifiers 511, 512, 513.

FIGS. 31, m, n show the combinations of the blocking signal with the blanking signals BL1, BL2, and BL3 at the blanking inputs 241, 242, 243 of the switchable amplifiers 511, 512, 513 in the form of logic AND operations. The dot-dash lines show resulting insertion signals A1, A2, A3 formed by these operations after the starting up of the circuit arrangement and before the occurrence of a beam current, i.e. in the first state of the logic network 22. Here the resulting insertion signals A1, A2, A3 are constant at low level. The dash curves show the resulting insertion signals A1, A2, A3 after the appearance of a beam current and before the steady state of the cut-off point control is reached, i.e. in the second state of the logic network 22, while the continuous curves represent the resulting insertion signals A1, A2, A3 in the steady state of the cut-off point control, i.e. in the third state of logic network 22. The dash curves have similar shapes to storage pulses L1, L2, L3, whereas the continuous curves correspond in shape to the inverses of the blanking signals BL1, BL2, BL3. In this case a high level of the resulting insertion signals A1, A2 or A3 means that the switchable amplifier 511, 512 or 513 feeds the colour signal to the relevant output amplifier 521, 522 or 523 respectively, whereas a low level in the resulting insertion signal A1, A2 or A3 means that the relevant switchable amplifier 511, 512 or 513 is blocked for the color signal.

The circuit arrangement described is designed in such a way that the trigger circuit 19 remains in its second state and logic network 22 remains in its third state even if charging currents reappear at the difference signal storage cpacitors 161, 162, 163 due to disturbances during the operation of the circuit arrangement. The cutoff point control then makes readjustments without the displayed picture being disturbed.

In the circuit arrangement shown in FIG. 2, the green color signal can also be let through during the second line period after the end of the vertical blanking pulse V and the blue color signal during the third line period after the end of the vertical blanking pulse V by the switchable amplifiers 511, 512, 513 for the purpose of controlling the beam currents. The storage pulses L2 and L3 at the control signal sampling switches 155 and 156 and the second and third blanking signals BL2 and BL3 at the blanking inputs 242 and 243 are then to be interchanged. The resulting insertion signals A2 and A3 as shown in FIGS. 3m and n are also interchanged then accordingly.

In FIG. 2 a dashed line is used to indicate which components of the circuit arrangement can be combined advantageously to form an integrated circuit. The first terminals 151, 152, 153 of the difference signal storage capacitors 161, 162, 163, one terminal 128 of leakage current storage capacitor 126, three terminals 524, 525, 526 in the leads to the output amplifiers 521, 522, 523 as well as a line connection 704 between the first terminal 701 of the measuring resistor 702 and the input 121 of the buffer amplifier 120 will then form the connecting contacts of this integrated circuit.

I claim:
1. Circuit arrangement for the control of at least one beam current in a picture tube by a picture comprising
a control loop which in one sampling interval obtains a measuring signal from the value of the beam current on the occurrence of a given reference level in the picture signal, stores a control signal derived therefrom until the next sampling interval and thereby adjusts the beam current to a value preset by a reference signal.
and a trigger circuit which suppresses auxiliary pulses used to generate the beam current after the picture tube has been started up and issues a switching signal for the purpose of closing the control loop during the sampling intervals and for releasing the control of the beam current by the picture signal after the measuring signal has exceeded the threshold value,
a change detection arrangement which delivers a change signal when the stored signal has assumed a largely constant value, and
a logic network which does not release the control of the beam current by the picture signal outside the sampling intervals until the change signal has also been issued after the switching signal.

2. Circuit arrangement as set forth in claim 1, in which the picture signal comprises several color signals for the control of a corresponding number of beam currents for the display of a color picture in the picture tube and the control loop stores a part measuring signal or a part control signal derived therefrom for each color signal, characterized in that the change detection arrangement includes a change detector for each color signal which delivers a part change signal when the relevant stored signal has assumed a largely constant value, and the logic network does not release the control of the beam currents by the color signals outside the sampling intervals until the part change signals have been delivered by all change detectors.

3. Circuit arrangement as set forth in claim 1, including a comparator arrangement which compares the measuring signal with the reference signal and derives the control signal from this comparison, characterized in that the change detection arrangement detects a change in the control signal with respect to time and issues the change signal when the control signal has assumed a largely constant value.

4. Circuit arrangement as set forth in claims 1, 2, 3 including a control signal memory which contains at least one capacitor, characterized in that the change detection arrangement delivers the change signal when a charge-reversing current of the capacitor occuring during the starting up of the picture tube falls below a limit value.

5. Circuit arrangement as set forth in claim 2, including a comparator arrangement which compares the measuring signal with the reference signal and derives the control signal from this comparison, characterized in that the change detection arrangement detects a change in the control signal with respect to time and issues the change signal when the control signal has assumed a largely constant value.

* * * * *

UNITED STATES PATENT AND TRADEMARK OFFICE
CERTIFICATE OF CORRECTION

PATENT NO. : 4,698,557
DATED : October 6, 1987
INVENTOR(S) : Hartmut Harlos

It is certified that error appears in the above-identified patent and that said Letters Patent is hereby corrected as shown below:

<u>IN THE CLAIMS</u>

| | | |
|---|---|---|
| Claim 1. | line 2 | after "picture" insert --signal |
| | | after "comprising" insert --:-- |
| | line 9 | after "signal" insert --,-- |
| | line 10 | delete "and" |
| Claim 4. | line 1 | after "3" insert --or 5,-- |

Signed and Sealed this

Thirteenth Day of December, 1988

*Attest:*

DONALD J. QUIGG

*Attesting Officer*  *Commissioner of Patents and Trademarks*